United States Patent
Lee et al.

(10) Patent No.: US 7,369,829 B2
(45) Date of Patent: May 6, 2008

(54) SIGNAL RECEPTION APPARATUS AND METHOD FOR MULTI-BAND ULTRA-WIDEBAND COMMUNICATION SYSTEMS

(75) Inventors: Ye-hoon Lee, Suwon-si (KR); Seung-young Park, Seoul (KR); Yong-suk Kim, Daejeon (KR); Wan-jin Kim, Seoul (KR); Woo-kyung Lee, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 667 days.

(21) Appl. No.: 10/915,452

(22) Filed: Aug. 11, 2004

(65) Prior Publication Data

US 2005/0037805 A1    Feb. 17, 2005

(30) Foreign Application Priority Data

Aug. 12, 2003   (KR) ...................... 10-2003-0055862

(51) Int. Cl.
  *H04B 7/00*  (2006.01)
  *H04B 1/06*  (2006.01)
(52) U.S. Cl. .................. 455/255; 455/553.1; 455/313; 455/266
(58) Field of Classification Search ............. 455/553.1, 455/552.1, 454, 103, 63.1, 180.1, 189.1, 455/190.1, 141, 147, 207, 209, 266, 85, 86, 455/258, 93, 255, 260, 313; 375/295, 130, 375/196
See application file for complete search history.

(56) References Cited

U.S. PATENT DOCUMENTS 5,677,927 A    10/1997  Fullerton et al.
6,026,125 A *  2/2000  Larrick et al. .............. 375/295
2002/0167991 A1* 11/2002  Suzuki ....................... 375/130
2004/0161018 A1*  8/2004  Maric .......................... 375/136
2005/0018750 A1*  1/2005  Foerster et al. ............. 375/130

FOREIGN PATENT DOCUMENTS

EP           1 292 043 A1    3/2003
WO     WO 2004/025853 A2    3/2004

* cited by examiner

*Primary Examiner*—Nay Maung
*Assistant Examiner*—John J. Lee
(74) *Attorney, Agent, or Firm*—Sughrue Mion, PLLC

(57) ABSTRACT

A signal reception apparatus and method for communication systems. The signal reception apparatus for communication systems according to the present invention is applicable to communication environments in which a plurality of sub-bands having different frequency bands are sequentially used for communications. An embodiment of the invention has a multi-band index generation unit, a multi-band frequency generation unit, a multiplication unit, a correlation signal reception unit, and a buffer unit. The multi-band index generation unit generates a multi-band index corresponding to a sub-band to which a received signal is transmitted in correspondence with the multi-band index. The multiplication unit outputs a signal obtained by multiplying the received signal by the multi-band frequency. The correlation signal reception unit integrates and outputs the signal of the multiplication unit based on an integral time set in correspondence with the multi-band index. Further, the buffer unit buffers the signal of the correlation signal reception unit to be outputted at a predetermined data rate.

10 Claims, 8 Drawing Sheets

SIGNAL RECEPTION APPARATUS AND METHOD FOR MULTI-BAND ULTRA-WIDEBAND COMMUNICATION SYSTEMS

CROSS-REFERENCE TO RELATED APPLICATION

This application claims the benefit of Korean Patent Application No. 2003-55862, filed on Aug. 12, 2003, in the Korean Intellectual Property Office, the disclosure of which is incorporated herein by reference.

BACKGROUND OF THE INVENTION

1. Field of the Invention

The present invention relates to a signal reception apparatus and a method for communication systems, and more particularly, to a signal reception apparatus and a method for multi-band Ultra-Wideband communication systems capable of compensating for a channel attenuation difference among reception signals for respective bands occurring due to different central frequencies of respective bands.

2. Description of the Related Art

Ultra-Wideband communications known as wireless digital pulses are based on a wireless communication technology for transmitting large amounts of digital data through a wide range of frequency spectrum at a low power in a short range. The Ultra-Wideband communications can intermittently transmit data, using an ultra wideband comprising a few GHz to transmit wireless data, so that the Ultra-Wideband communications are expected to solve a frequency slot shortage phenomenon. Ultra-Wideband communications have an advantage that communications can be carried out at an ultra high-speed transmission rate of 500 Mbps-1 Gbps, but power consumption is low at a level of one one-hundredth of the power consumed for products such as cellular phones, wireless LANs, and the like, despite such a fast transmission speed. As the core technologies for the Ultra-Wideband communications, there are UWB modem technology of 100 Mps class, MAC technology for supporting the high QoS (Quality of Service), and small-sized antenna technology suitable to the wideband transmission.

In the meantime, single band and multi-band approaches have been proposed recently for the Ultra-Wideband communication technology standard. The single band approach is an approach which covers the entire bandwidth of an available frequency band, and the multi-band approach is an approach that uses plural sub-bands in which the entire bandwidth of an available frequency band is divided into the plural sub-bands. Current multi-band Ultra-Wideband communication systems use M sub-bands divided in the available frequency band existing between 3.1 GHz and 10.6 GHz.

FIG. 1 illustrates a frequency spectrum for a multi-band Ultra-Wideband communication system having sub-bands of M=16. Referring to FIG. 1, the first eight sub-bands (0-7) are allocated to a low frequency set, and the next eight sub-bands (8-15) are allocated for a high frequency set. In FIG. 1, a region marked Unexpected interferer denotes a region where interference can occur due to overlapping with a frequency band used in the other communication system. The following table shows central frequencies Fc, low band frequencies FL, and high band frequencies FH for respective sub-bands.

TABLE 1

| #A/B | Fc | FL | FH |
|------|------|-------|--------|
| 0A | 3.52 | 3.251 | 3.789 |
| 0B | 3.74 | 3.471 | 4.009 |
| 1A | 3.96 | 3.691 | 4.229 |
| 1B | 4.18 | 3.911 | 4.449 |
| 2A | 4.4 | 4.131 | 4.669 |
| 2B | 4.62 | 4.351 | 4.889 |
| 3A | 4.84 | 4.571 | 5.109 |
| 3B | 5.06 | 4.791 | 5.329 |
| 4A | 5.28 | 5.011 | 5.549 |
| 4B | 5.5 | 5.231 | 5.769 |
| 5A | 5.72 | 5.451 | 5.989 |
| 5B | 5.94 | 5.671 | 6.209 |
| 6A | 6.16 | 5.891 | 6.429 |
| 6B | 6.38 | 6.111 | 6.649 |
| 7A | 6.6 | 6.331 | 6.869 |
| 7B | 6.82 | 6.551 | 7.089 |
| 8A | 7.04 | 6.771 | 7.309 |
| 8B | 7.26 | 6.991 | 7.529 |
| 9A | 7.48 | 7.211 | 7.749 |
| 9B | 7.7 | 7.431 | 7.969 |
| 10A | 7.92 | 7.651 | 8.189 |
| 10B | 8.14 | 7.871 | 8.409 |
| 11A | 8.36 | 8.091 | 8.629 |
| 11B | 8.58 | 8.311 | 8.849 |
| 12A | 8.8 | 8.531 | 9.069 |
| 12B | 9.02 | 8.751 | 9.289 |
| 13A | 9.24 | 8.971 | 9.509 |
| 13B | 9.46 | 9.191 | 9.729 |
| 14A | 9.68 | 9.411 | 9.949 |
| 14B | 9.9 | 9.631 | 10.169 |
| 15A | 10.12 | 9.851 | 10.389 |

For example, considering a frequency plan B as a reference, the sub-band 14B including the highest frequencies in the sub-band, has a central frequency of 9.9 GHz, and the sub-band 0B comprising the lowest frequencies in the sub-band has a central frequency of 3.74 GHz. When the two central frequencies are compared, it can be seen that the central frequency of sub-band 14B is 2.65 times the central frequency of sub-band 0B. Since signal attenuation in a channel is proportional to the square of the frequency, a signal transmitted through the 9.9 GHz band undergoes 7 times more channel attenuation (8.45 dB) as compared to a signal transmitted through a 3.74 GHz band.

FIG. 2 is a block diagram illustrating a signal reception apparatus for a conventional multi-band Ultra-Wideband communication system. Referring to FIG. 2, a signal reception apparatus for a conventional multi-band Wideband communication system has a multi-band index generation unit 10, a multi-band frequency generation unit 12, a multiplication unit 13, a correlation signal reception unit 14, and a signal processing unit 16.

The multi-band index generation unit 10 calculates a multi-band index m corresponding to each sub-band of a received multi-band Ultra-Wideband communication signal. The multi-band frequency generation unit 12 generates a multi-band frequency for each sub-band according to the multi-band index m inputted from the multi-band index generation unit 10. The multiplication unit 13 outputs a signal obtained by multiplying a multi-band Ultra-Wideband communication signal received through an antenna by a multi-band frequency. The correlation signal reception unit 14 outputs an integral value with respect to the signal of the multiplication unit 13 in regard to a certain integral time. Further, the signal processing unit 16 processes the signal outputted from the correlation signal reception unit 14 and restores a signal transmitted from a signal transmission apparatus.

However, when the correlation signal reception unit 14 processes a signal transmitted through each of M sub-bands, the signal reception apparatus for the conventional Ultra-Wideband communication system uses an approach to sum up energies of respective received signals over the time period with respect to respective sub-bands in regard to the same integral time. Accordingly, as described in relation to Table 1, the energy difference of a received signal per sub-band can occur up to 8.45 dB at maximum.

Such energy differences among received signals by sub-bands cause bit error rates (BERs) by sub-bands which are different from one another. At this time, an average bit error rate of the entire sub-bands is mainly affected by a bit error rate of a signal received through a sub-band having the largest channel attenuation, that is, a sub-band having the highest central frequency, which causes deterioration of the performance of the entire multi-band Ultra-Wideband communication system.

SUMMARY OF THE INVENTION

Accordingly, it is an aspect of the present invention to provide a signal reception apparatus and method for communication systems capable of improving an entire performance of the systems by reducing energy differences among signals received by sub-bands in the communication systems performing multi-band Ultra-Wideband communications.

In order to achieve the above aspect, a signal reception apparatus for communication systems according to the present invention sequentially uses plural sub-bands having different frequency bands for communications, and comprises a multi-band index generation unit for generating a multi-band index corresponding to a sub-band to which a received signal is transmitted; a multi-band frequency generation unit for generating a multi-band frequency with respect to the sub-band to which the received signal is transmitted in correspondence to the multi-band index; a multiplication unit for outputting a signal obtained from multiplying the received signal by the multi-band frequency; a correlation signal reception unit for integrating and outputting the signal of the multiplication unit based on an integral time set in correspondence to the multi-band index; and a buffer unit for buffering the signal of the correlation signal reception unit to be outputted at a predetermined data rate. In accordance with one embodiment, the signal reception apparatus further comprises a signal processing unit for processing the signal of the buffer unit and restoring a signal transmitted from a signal transmission apparatus.

The correlation signal reception unit includes a received integral time adjustor for calculating the integral time corresponding to the multi-band index; a correlator for integrating and outputting the signal of the multiplication unit in regard to the integral time; and a sampler for sampling and outputting the signal of the correlator based on the integral time.

Further, the integral time is set larger at a sub-band having a high central frequency than at a sub-band having a low central frequency to compensate for a channel attenuation difference by sub-band. Furthermore, the signal reception apparatus for communication systems according to the present invention can be applied to the multi-band Ultra-Wideband communication systems.

In a signal reception method for communication systems sequentially using plural sub-bands having different frequency bands for communications, the signal reception method for communication systems according to the present invention comprises the steps of generating a multi-band index corresponding to a sub-band to which a received signal is transmitted; generating a multi-band frequency with respect to the sub-band to which the received signal is transmitted corresponding to the multi-band index; outputting a signal obtained from multiplying the received signal by the multi-band frequency; integrating and outputting a signal obtained from multiplying the received signal by the multi-band frequency based on an integral time set in correspondence to the multi-band index; and buffering the integrated and outputted signal to be outputted at a predetermined data rate. In accordance with one embodiment, the signal reception method further comprises a step of processing the buffered and outputted signal and restoring a signal transmitted from a signal transmission side. Further, the integration and output step includes steps of calculating the integral time in correspondence to the multi-band index; outputting an integral value obtained from multiplying the received signal by the multi-band frequency in regard to the integral time; and sampling and outputting the integral value based on the integral time.

The integral time is set larger at a sub-band having a high central frequency than at a sub-band having a low central frequency to compensate for a channel attenuation difference by sub-band. Furthermore, the signal reception method for communication systems according to the present invention can be applied to multi-band Ultra-Wideband communication systems.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENTS

Hereinafter, the present invention will be described in detail with reference to the accompanying drawings.

Figure 1:
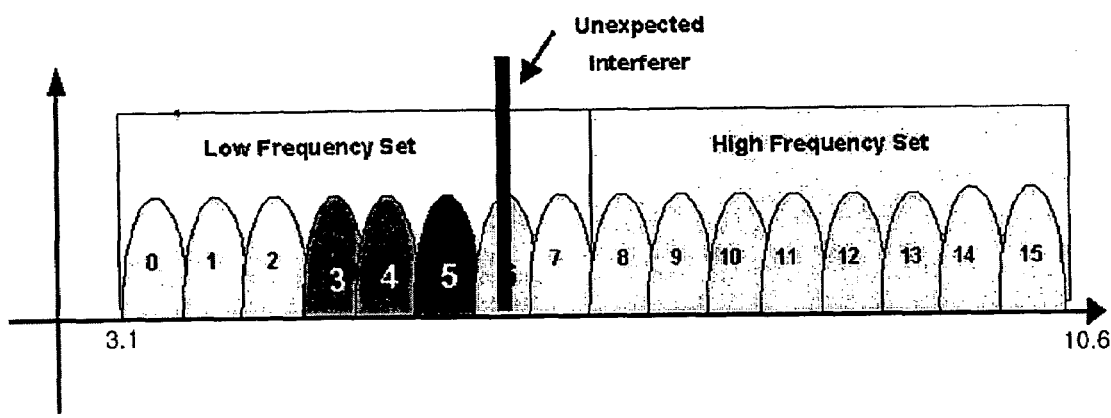
FIG. 1 illustrates a frequency spectrum for a multi-band Ultra-Wideband communication system.
Figure 2:
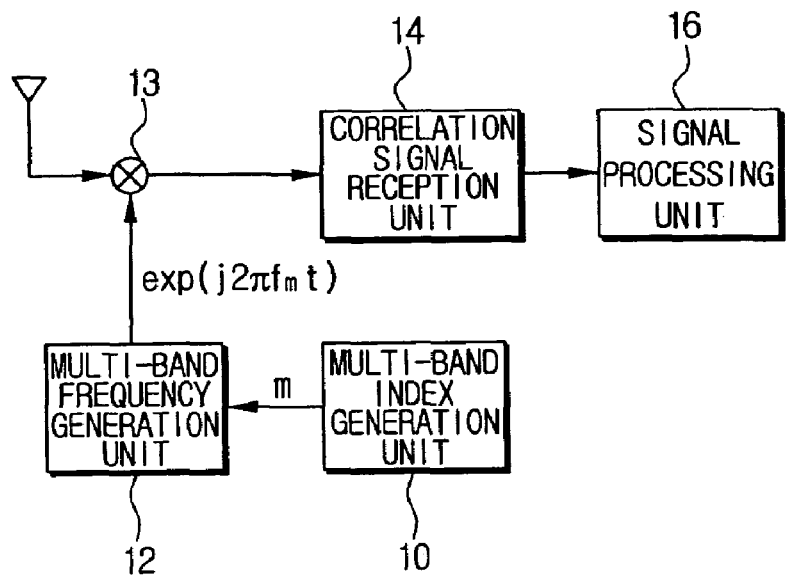
FIG. 2 is a block diagram illustrating a signal reception apparatus for a conventional multi-band Ultra-Wideband communication system.
Figure 3:
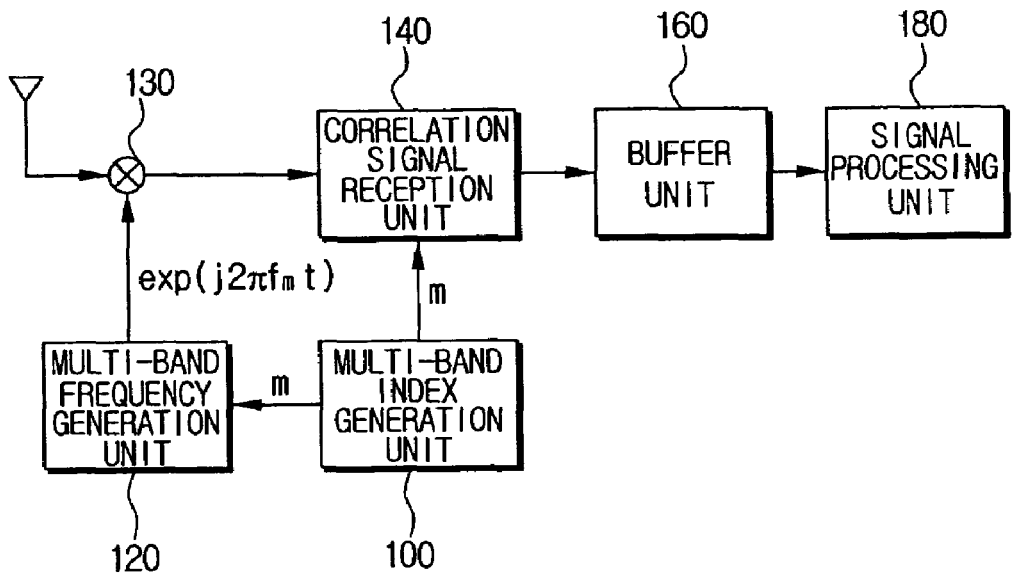
FIG. 3 is a block diagram for illustrating a signal reception apparatus for communication systems according to an embodiment of the present invention.

FIG. 3 is a block diagram illustrating a signal reception apparatus for communication systems performing multi-band Ultra-Wideband communications according to an embodiment of the present invention. Referring to FIG. 3, the signal reception apparatus for communication systems is provided with a multi-band index generation unit 100, a multi-band frequency generation unit 120, a multiplication unit 130, a correlation signal reception unit 140, a buffer unit 160, and a signal processing unit 180.

The multi-band index generation unit 100 calculates a multi-band index m corresponding to each sub-band to which a received multi-band Ultra-Wideband communication signal is transmitted. The multi-band frequency generation unit 120 receives the multi-band index m and outputs a multi-band frequency, $\exp(j2\pi f_m)$, with respect to each sub-band based on the multi-band index m calculated in the multi-band index generation unit 100. The multiplication unit 130 outputs a signal obtained from multiplying a multi-band Ultra-Wideband communication signal received through an antenna by the multi-band frequency. The correlation signal reception unit 140 calculates an integral value with respect to the signal outputted from the multiplication unit 130 in regard to an integral time variably set based on the multi-band index m calculated in the multi-band index generation unit 100. The buffer unit 160 stores a signal outputted from the correlation signal reception unit 140, buffers the output timing to be constantly maintained, and outputs the stored signal. Further, the signal processing unit 180 processes the signal outputted from the buffer unit 160 and restores a signal transmitted from a signal transmission apparatus.

Figure 4:
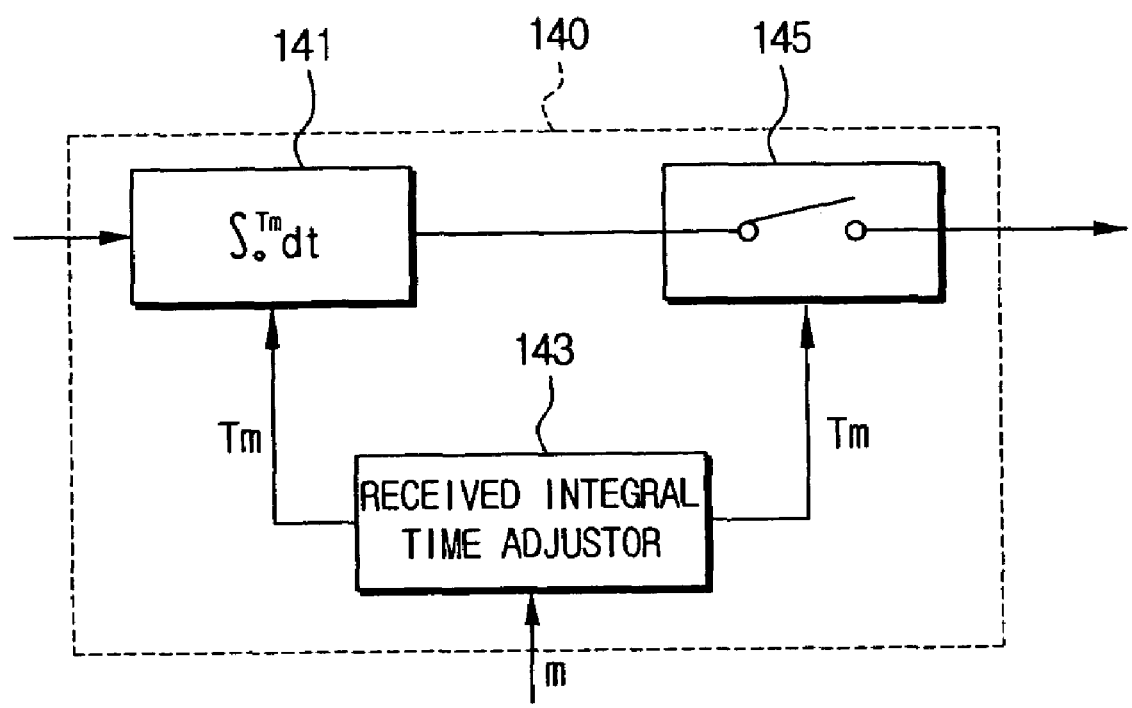
FIG. 4 is a detailed block diagram for showing the correlation signal reception unit of FIG. 3.

FIG. 4 is a detailed block diagram illustrating the correlation signal reception unit 140 of FIG. 3. Referring to FIG. 4, the correlation signal reception unit 140 has a correlator 141, a received integral time adjustor 143, and a sampler 145. The received integral time adjustor 143 inputs the multi-band index m calculated in the multi-band index generation unit 100, and calculates an integral time $T_m$ corresponding to the multi-band index m. The integral time $T_m$ calculated in the received integral time adjustor 143 is outputted to the correlator 141 and the sampler 145. The correlator 141 integrates and outputs a signal outputted from the multiplication unit 130 based on the time $T_m$ transferred from the received integral time adjustor 143. The sampler 145 samples the output of the correlator 141 every Tm time interval and outputs the sampled signal to the buffer 160 (FIG. 3).

Figure 5:
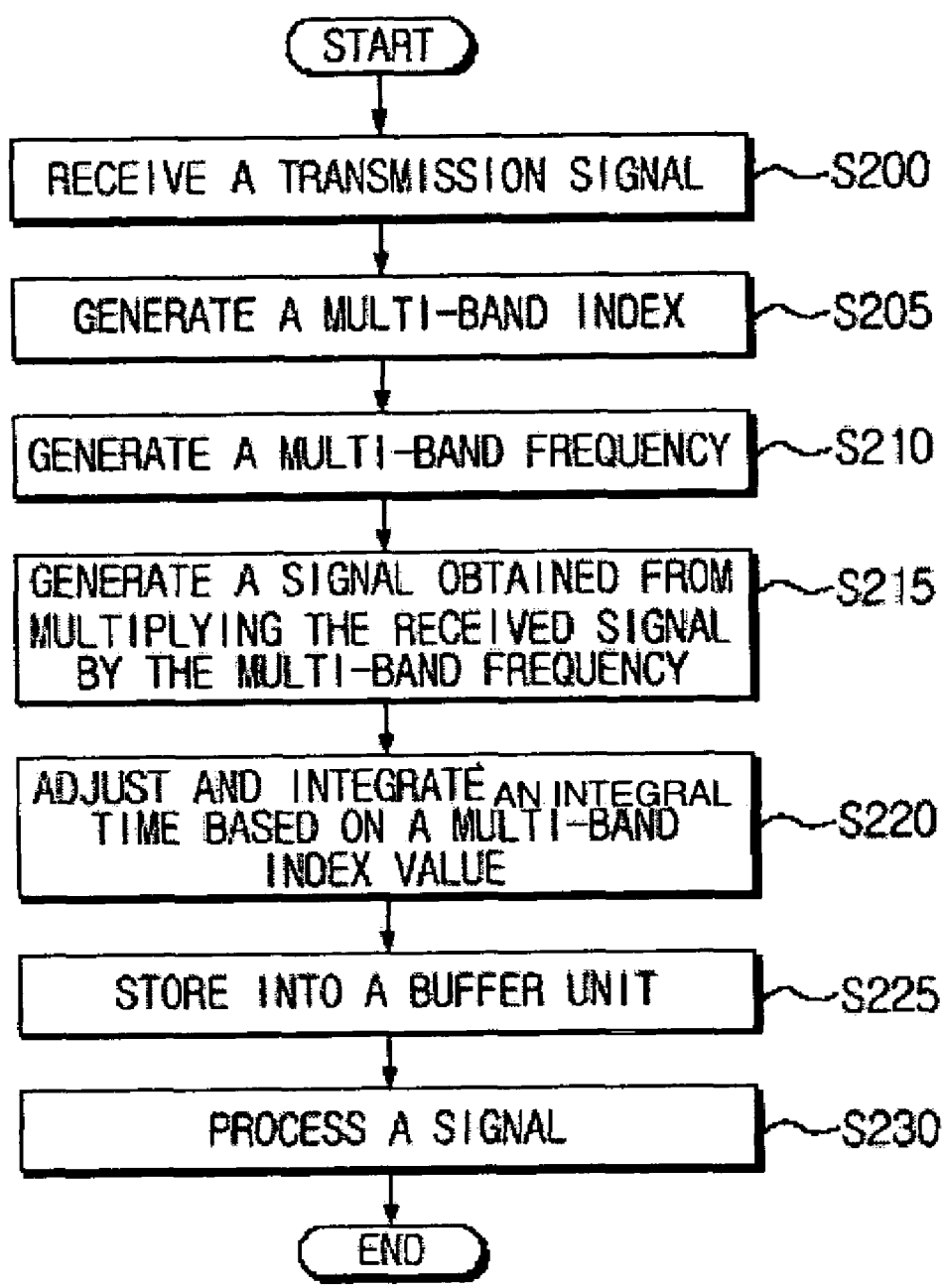
FIG. 5 is a flow chart for illustrating an operation method for the signal reception apparatus for communication systems according to an embodiment of the present invention.

FIG. 5 is a flow chart for explaining an operation method for a signal reception apparatus for communication systems according to an embodiment of the present invention. Referring to FIG. 3 to FIG. 5, first, the signal reception apparatus receives a multi-band Ultra-Wideband communication signal through an antenna (S200).

A transmission signal generated in a signal transmission apparatus for a multi-band Ultra-Wideband communication system can be expressed by Equation 1, as follows:

$$x(t)=\sqrt{2P}d(t)\cos(2\pi f_m t+\theta_m), (m-1)T \leq t \leq mT \quad (1)$$

wherein P denotes transmission power, d(t) a binary data signal, m the total number of sub-bands, and $f_m$ and $\theta_m$ denote a central frequency and a phase, respectively. Since such a transmission signal is sequentially transmitted sub-band by sub-band with a time delay as large as T seconds, a signal received through an antenna can be expressed by Equation 2, as follows:

$$y(t)=\sqrt{2PL_m G_m}d(t-\tau)\cos(2\pi f_m t+\phi_m)+n(t), (m-1)T \leq t \leq mT \quad (2)$$

wherein $L_m$ and $G_m$ denote channel attenuation occurring in each channel by sub-band respectively and a channel power gain occurring due to multi-channel fading, n(t) denotes white gaussian noise, $\tau$ denotes a delay occurring in a channel, and $\phi_m=\theta_m-2\pi f_m \tau$.

The multi-band index generation unit 100 generates a multi-band index m corresponding to each sub-band to which a received multi-band Ultra-Wideband communication signal is transmitted (S205). The multi-band index m generated from the multi-band index generation unit 100 is transferred to the multi-band frequency generation unit 120, and the multi-band frequency generation unit 120 generates a multi-band frequency for a sub-band corresponding to the multi-band index m (S210). The multiplication unit 130 generates a signal obtained from multiplying the received multi-band Ultra-Wideband communication signal by the multi-band frequency (S215). A signal produced from the multiplication unit 130 is outputted to the correlation signal reception unit 140.

The correlation signal reception unit 140 inputs the multi-band index m, calculates an integral time $T_m$ based on the multi-band index m, and outputs a value obtained from integrating the signal outputted from the multiplication unit 130 in regard to the calculated integral time $T_m$ (S220). The integral time $T_m$ calculated in the correlation signal reception unit 140 is a value that increases in accordance with the multi-band index, which is expressed by Equation 3, as follows:

$$T_1 \leq T_2 \leq \ldots \leq T_M \quad (3)$$

That is, whereas the conventional signal reception apparatus for Ultra-Wideband communication systems uses a certain integral time, the present invention uses a variable integral time by sub-band. A bit energy outputted from the correlation signal reception unit 140 can be expressed by Equation 4 as follows, in regard to such an integral time:

$$E_b=PL_m G_m T_m \quad (4)$$

A signal outputted from the correlation signal reception unit 140 is stored in the buffer unit 160 (S225), the buffer unit 160 buffers the stored signal to constantly maintain the output timing and outputs the stored signal. Such buffering is necessary since the output timing of a signal outputted from the correlation signal reception unit 140 is varied by using a different integral time depending upon a sub-band in the correlation signal reception unit 140. The signal outputted from the buffer unit 160 is transferred to the signal processing unit 180 (S230), so that a signal transmitted from the signal transmission apparatus is restored.

Figure 6:
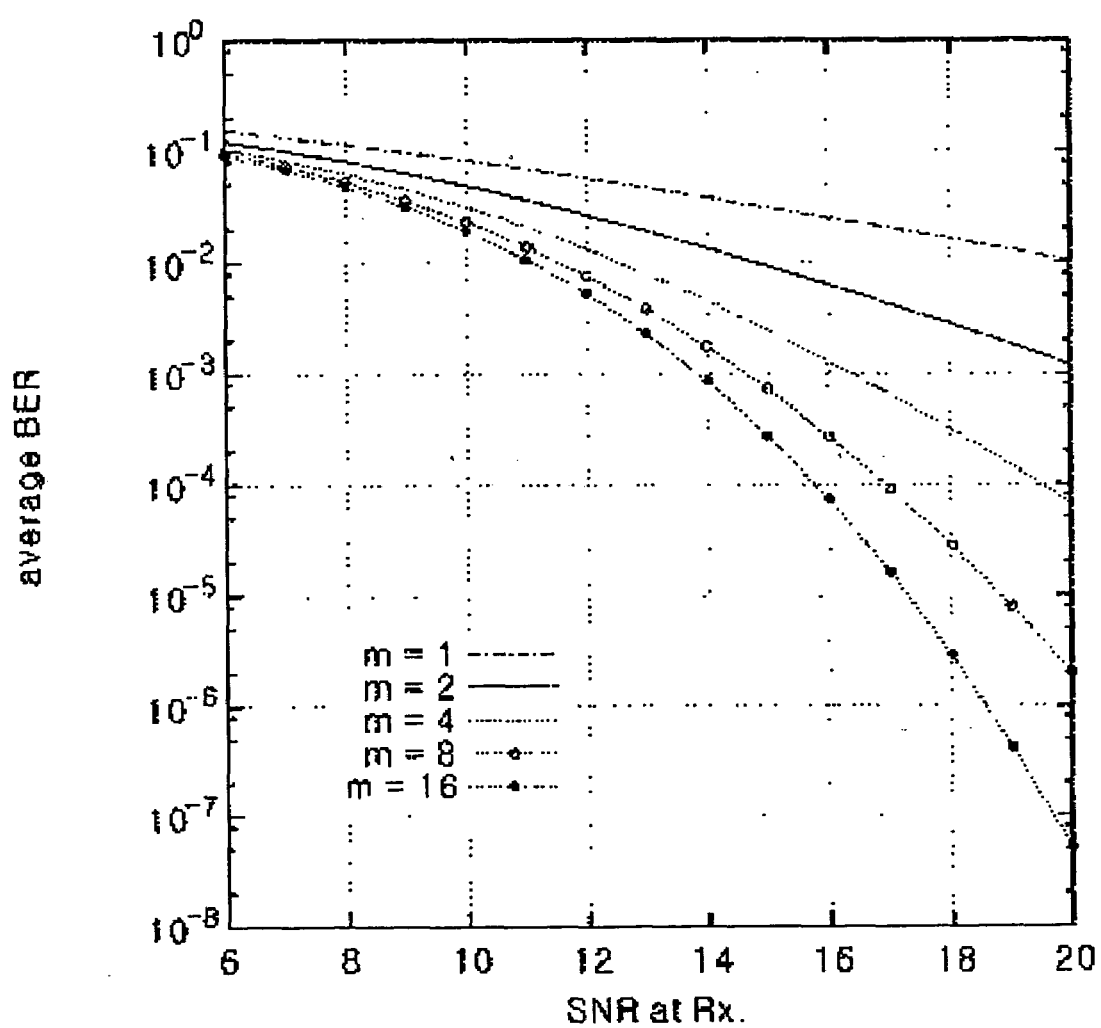
FIG. 6 illustrates bit error rates based on received signal-to-noise ratios.

FIG. 6 illustrates bit error rates based on received signal-to-noise ratios with respect to the Nakagami fading parameter m. Referring to FIG. 6, the bit error rate abruptly changes according to the changes of a received signal-to-noise ratio as a value m becomes larger. Accordingly, a difference among bit error rates by sub-bands in an extremely high frequency multi-band communication system becomes increasingly larger as the value m becomes larger, that is, as communication environments becomes better, so it can be predicted that a performance of the entire multi-band Ultra-Wideband communication system can be deteriorated.

Figure 7:
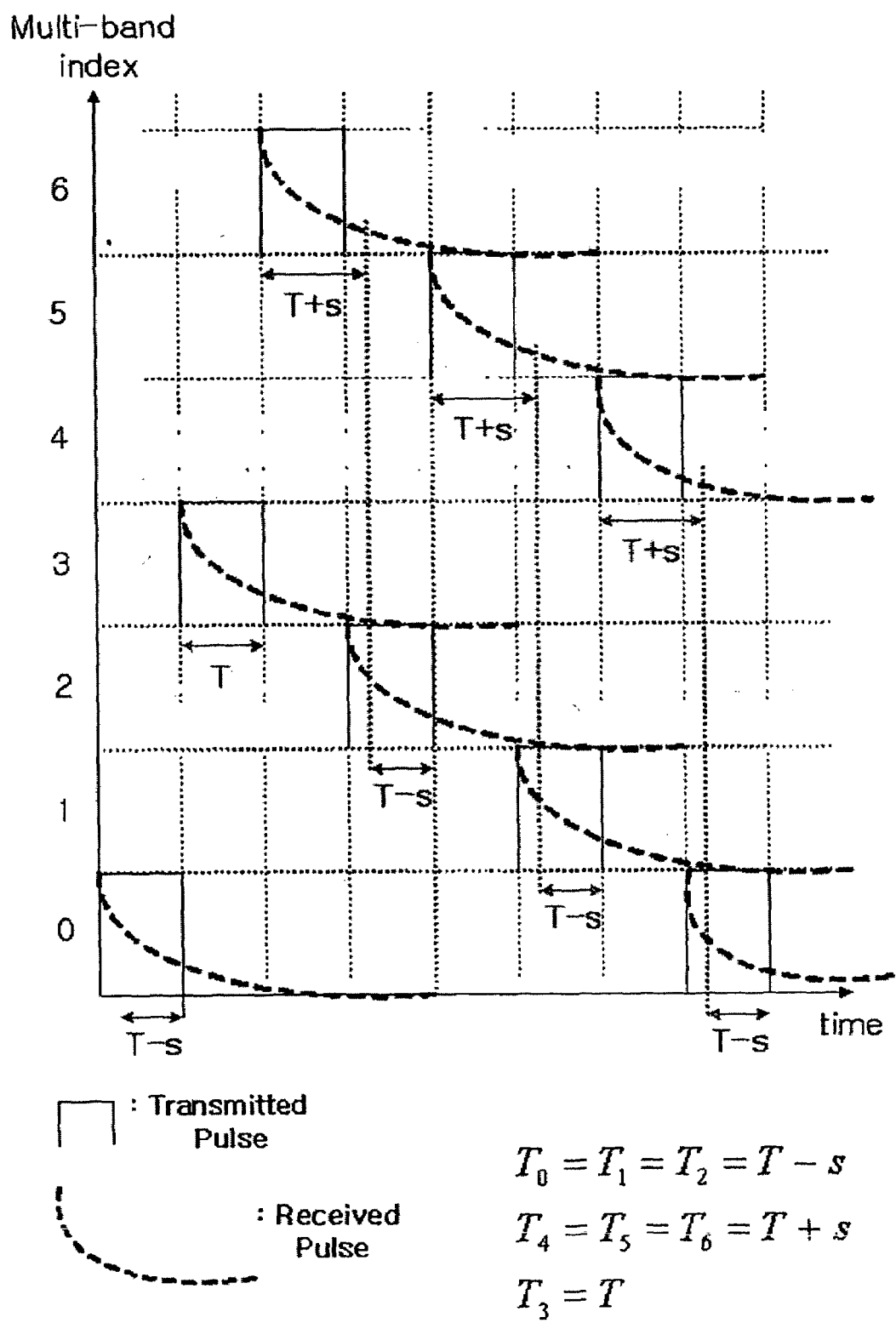
FIG. 7 illustrates integral times in the signal reception apparatus for communication systems according to an embodiment of the present invention.

FIG. 7 illustrates operations of the correlation signal reception unit 140 in the time-frequency domain when a signal reception apparatus for communication systems according to the present invention is applied. In FIG. 7, it is assumed that a multi-band Ultra-Wideband communication signal uses an S2 in a time-frequency sequence shown in Table 2 below. That is, it is a case that a multi-band Ultra-Wideband communication signal is sequentially transmitted in regard to a sequence in which the multi-band index is changed in 0-3-6-2-5-1-4.

TABLE 2

| S1 | 0 | 1 | 2 | 3 | 4 | 5 | 6 |
|----|---|---|---|---|---|---|---|
| S2 | 0 | 2 | 4 | 6 | 1 | 3 | 5 |
| S3 | 0 | 3 | 6 | 2 | 5 | 1 | 4 |
| S4 | 0 | 4 | 1 | 5 | 2 | 6 | 3 |
| S5 | 0 | 5 | 3 | 1 | 6 | 2 | 2 |
| S6 | 0 | 6 | 5 | 4 | 3 | 4 | 1 |

Referring to FIG. 7, the integral time is set to $T_0=T_1=T_2=T-s$ in case that the multi-band index is 0, 1, or 2, $T_4=T_5=T_6=T+s$ in case that the multi-band index is 4, 5, or 6, and $T_3=T$ in case that the multi-band index is 3. As above, a signal transmitted through a sub-band having less channel loss has a shorter integral time so that relatively less energy can be received, whereas a signal transmitted through a sub-band having more channel loss has a longer integral time so that relatively more energy can be received. In a case where the integral procedures are divided as shown in FIG. 7, the integral time used in the correlation signal reception unit 140 can be implemented in two system clocks of 1/T Hz and 1/s Hz, so that the signal reception apparatus for communication systems according to the present invention can be relatively simply implemented with the clock of 1/s Hz added compared to the conventional signal reception apparatus for Ultra-Wideband communication systems. Further, a clear performance improvement can be obtained as the integral time is divided in more multiple procedures.

Figure 8:
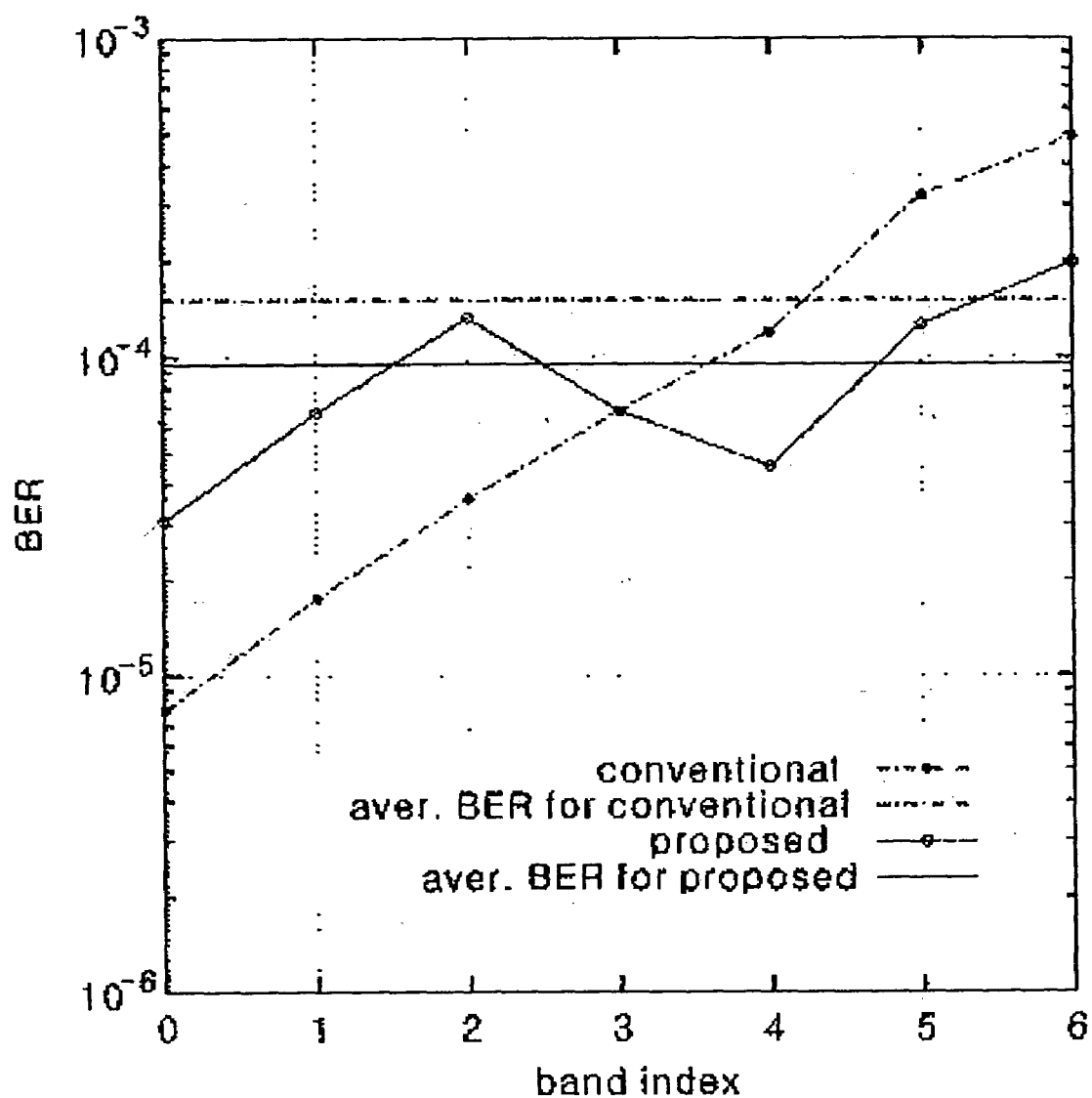
FIG. 8 illustrates a simulation result with respect to the signal reception apparatus for communication systems according to an embodiment of the present invention and a conventional signal reception apparatus for Ultra-Wideband communication systems.

FIG. 8 illustrates a simulation result with respect to the signal reception apparatus for communication systems according to an embodiment of the present invention and a conventional signal reception apparatus for Ultra-Wideband communication systems. FIG. 8 is a chart that compares simulation results in a case where a transmission signal-to-noise ratio is 20 dB and a Nakagami fading parameter m is 4. As shown in FIG. 8, a signal reception apparatus for communication systems according to the present invention variably uses the integral time so as to lower a bit error rate of a signal having a high frequency band adversely affecting an average bit error rate and, on the contrary, raise a bit error rate of a signal having a relatively low frequency band, to thereby lower an average bit error rate of the entire system.

Figure 9:
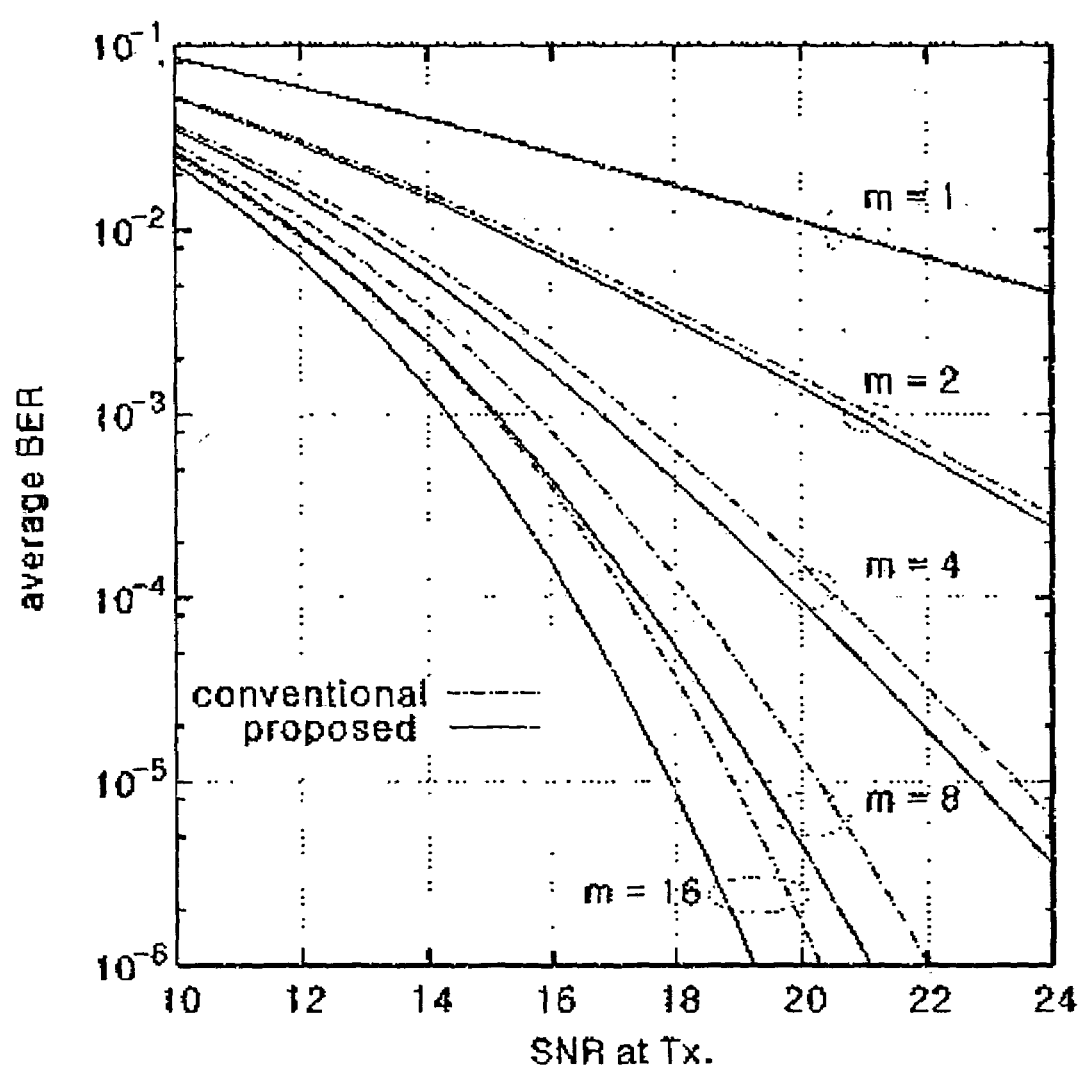
FIG. 9 illustrates a performance of the signal reception apparatus for communication systems according to an embodiment of the present invention.

FIG. 9 illustrates the performance of the signal reception apparatus for communication systems according to an embodiment of the present invention with respect to transmission signal-to-noise ratios and various channel parameters m. As predicted in FIG. 7, it can be seen that the Ultra-Wideband communication system according to the present invention can obtain a larger performance gain as the parameter m increases. For example, if m=16 and a required bit error rate is $10^{-6}$, the signal reception apparatus for Ultra-Wideband communication systems according to the present invention can obtain a performance gain of 1 dB. Such a performance gain can be obtained in case of the integral procedures described in FIG. 7, and a larger performance gain can be obtained in case that the integral time is adjusted in more procedures.

As described above, a signal reception apparatus for communication systems performing multi-band Ultra-Wideband communications according to the present invention adjusts an integral time of the correlation signal reception unit sub-band by sub-band, so that the signal reception apparatus can compensate for different channel attenuations by sub-band. With such compensations, the present invention can lower an average bit error rate of the entire system, and, with the average bit error rate lowered, the communication system can have a higher data transmission/reception rate.

Although the preferred embodiments of the present invention have been described, it will be understood by those skilled in the art that the present invention should not be limited to the embodiments described herein, but various changes and modifications can be made within the spirit and scope of the present invention as defined by the appended claims.

What is claimed is:

1. A signal reception apparatus for communication systems sequentially using a plurality of sub-bands having different frequency bands for communications, the signal reception apparatus comprising:
    a multi-band index generation unit which generates a multi-band index corresponding to a sub-band in which a received signal is transmitted;
    a multi-band frequency generation unit which generates a multi-band frequency with respect to the sub-band in which the received signal is transmitted in correspondence with the multi-band index;
    a multiplication unit which outputs a signal obtained by multiplying the received signal by the multi-band frequency;
    a correlation signal reception unit which integrates and outputs the signal output from the multiplication unit based on an integral time set in correspondence to the multi-band index; and
    a buffer unit which buffers the signal of the correlation signal reception unit to be outputted at a predetermined data rate.

2. The signal reception apparatus as claimed in claim 1, further comprising a signal processing unit which processes the signal from the buffer unit and restores a signal transmitted from a signal transmission apparatus.

3. The signal reception apparatus as claimed in claim 1, wherein the correlation signal reception unit comprises:
    a received integral time adjustor which calculates the integral time in correspondence with the multi-band index;
    a correlator which integrates and outputs the signal of the multiplication unit in regard to the integral time; and
    a sampler which samples and outputs the signal of the correlator based on the integral time.

4. The signal reception apparatus as claimed in claim 1, wherein the integral time is set larger at a sub-band having a relatively high central frequency than at a sub-band having a relatively low central frequency.

5. The signal reception apparatus as claimed in claim 1, wherein the communication systems are multi-band Ultra-Wideband communication systems.

6. A signal reception method for communication systems sequentially using a plurality of sub-bands having different frequency bands for communications, the signal reception method comprising:
    generating a multi-band index corresponding to a sub-band to which a received signal is transmitted;
    generating a multi-band frequency with respect to the sub-band to which the received signal is transmitted in correspondence with the multi-band index;
    outputting a signal obtained by multiplying the received signal by the multi-band frequency;

integrating and outputting the signal obtained by multiplying the received signal by the multi-band frequency based on an integral time set in correspondence with the multi-band index; and buffering the integrated and outputted signal to be outputted at a predetermined data rate.

7. The signal reception method as claimed in claim 6, further comprising processing the buffered and outputted signal and restoring a signal transmitted from a signal transmission side.

8. The signal reception method as claimed in claim 6, wherein the integrating and outputting comprises:

calculating the integral time in correspondence with the multi-band index;

outputting an integral value obtained by multiplying the received signal with the multi-band frequency in regard to the integral time; and sampling and outputting the integral value based on the integral time.

9. The signal reception method as claimed in claim 6, wherein the integral time is set larger at a sub-band having a relatively high central frequency than at a sub-band having a relatively low central frequency.

10. The signal reception method as claimed in claim 6, wherein the communication systems are multi-band Ultra-Wideband communication systems.

* * * * *